United States Patent [19]
Penneck et al.

[11] 4,001,065
[45] Jan. 4, 1977

[54] CROSS-LINKED OLEFINE-ESTER TAPES

[75] Inventors: Richard John Penneck, Lechlade; Robin James Thomas Clabburn, Highworth, both of England

[73] Assignee: Raychem Corporation, Menlo Park, Calif.

[22] Filed: Apr. 17, 1975

[21] Appl. No.: 568,935

Related U.S. Application Data

[63] Continuation of Ser. No. 296,626, Oct. 11, 1972, abandoned.

[30] Foreign Application Priority Data

Oct. 12, 1971  United Kingdom ............ 47471/71

[52] U.S. Cl. .................................. 156/86; 526/324; 156/189; 156/191; 156/214; 156/229; 204/159.15; 204/159.16; 260/878 R; 264/103; 427/35; 427/54; 264/230; 264/288; 264/DIG. 71

[51] Int. Cl.$^2$ ........................................ B29C 27/20

[58] Field of Search ............ 156/86, 189, 191, 214, 156/475, 229, 272; 260/78.5 R, 86.7, 897 R, 878 R; 427/35, 54; 204/159.16, 159.15; 264/103, 288, 291, DIG. 71, 230, 342

[56] References Cited

UNITED STATES PATENTS

| | | | |
|---|---|---|---|
| 2,941,570 | 6/1960 | Plym | 156/475 |
| 3,429,954 | 2/1969 | Atkins et al. | 156/86 |
| 3,582,457 | 6/1971 | Barthell | 156/86 |
| 3,758,353 | 9/1973 | Huriez | 156/86 |

Primary Examiner—Edward G. Whitby
Attorney, Agent, or Firm—Lyon & Lyon

[57] ABSTRACT

A process of wrapping a substrate to insulate or protect it, wherein a tape comprising a cross-linked copolymer derived from an ethylenically unsaturated hydrocarbon and a carboxylic acid ester having ethylenic unsaturation is wrapped around the substrate, and subsequently shrunk. Although the tape is cross-linked, it nevertheless fuses sufficiently to bond to itself to form an integral structure. The substrate can if desired be removed, the tape serving as the inner layer to a hose.

20 Claims, No Drawings

CROSS-LINKED OLEFINE-ESTER TAPES

This is a continuation of application Ser. No. 296,626, filed Oct. 11, 1972, now abandoned.

This invention relates to the covering of articles by means of wrapping tapes.

It has been proposed, for example in U.S. Pat. No. 3,033,727, to wrap electrical components by wrapping tapes which are capable of shrinking on being heated. This U.S. patent employs one pre-stretched, polymeric tape which is cross-linked and non-fusible and which shrinks on heating, in combination with another polymeric tape which is not cross-linked and which fuses on heating. This combination of tapes is employed (and is stated to give good results) in insulating electrical apparatus in such a manner that there are no voids remaining after wrapping the two tapes over the apparatus and heating. Heating fuses the non-crosslinked tape, which is applied under the crosslinked tape, while causing the stretched tape to shrink and force the fusing tape to fill any irregular voids in the apparatus.

The product of the U.S. patent is said to overcome the problems associated with the single, shrinkable tape described in U.S. patent application Ser. No. 518,403 of June 27, 1955, wherein voids remain after shrinking the tape. Additionally, the wraps of the tape do not, in fact, become an integral structure.

Use of the invention of U.S. Pat. No. 3,033,727 does, however, have certain difficulties, not the least of which is the duplicate wrapping required. It is necessary to ensure that both tapes are positioned so as sufficiently to overlay previous wrappings by the correct amount and this necessary care increases installation cost. Also, of course, the double manufacturing and applying operations increase the risk of failure manifold.

The present invention provides a heat-shrinkable tape (preferably one which is shrinkable along its length and most preferably one which is shrinkable along its length without substantial change in its width) of a material comprising a crosslinked copolymer derived from an ethylenically unsaturated hydrocarbon and a carboxylic acid ester having ethylenic unsaturation.

The present invention also provides a method of covering a substrate, which comprises applying to the substrate a tape of a material comprising a crosslinked copolymer derived from an ethylenically unsaturated hydrocarbon and a carboxylic acid ester having ethylenic unsaturation by wrapping the tape around the substrate and heating the tape to cause it to shrink. The shrinkability may be imparted to the tape before or during the wrapping process, as discussed below.

Using the specified copolymer it is found when the material is heated it bonds to itself with such a degree of adhesion that the layers appear to coalesce. The bonding is also achieved to many substrates.

The ethylenically unsaturated hydrocarbon is preferably ethylene or an $\alpha$-ethylenically unsaturated aliphatic hydrocarbon.

The carboxylic acid ester may be derived either from an unsaturated alcohol and a saturated carboxylic acid or from a saturated alcohol and an unsaturated carboxylic acid. As examples, there may be mentioned vinyl acetate, butyrate and propionate; esters (for example methyl, ethyl esters) of fumaric, maleic and itaconic acids, including the mono- and di-esters, and esters of acrylic or methacrylic acid.

It will be understood that the copolymers may be derived from more than one member of each of the above-mentioned groups; in addition, the copolymer may contain units derived from monomers other than those within the groups. For example, some vinyl acetate units of an ethylene-vinyl acetate copolymer may be saponified to yield alcoholic groups, while partial saponification of an ethylene-ethyl acrylate copolymer yields a polymer containing carboxylic acid groups. Alternatively the copolymer may be a terpolymer, ethylene-vinyl acetate-unsaturated carboxylic acid copolymers being examples of effective materials. Blends of a polymer according to the invention may also be employed, including blends of two or more polymers according to the invention as well as blends of one or more polymers according to the invention with polymers other than according to the invention. As polymers outside those employed according to the invention especially suitable for such blends there may be mentioned copolymers of ethylene with ethylenically unsaturated carboxylic acids, for example with acrylic, methacrylic, maleic, fumaric or itaconic acids. In cases where acid groups are present in the polymer or the blend they may be neutralized in whole or in part by metals, for example, the alkali metals, alkaline earth metals, zinc, magnesium or aluminum. For example ionomers (for example the Surlyns made by E. I. Du Pont de Nemours & Co. Inc.) may be employed in the blends. In the case of trivalent salts, for example aluminium, crosslinking usually occurs and the method of crosslinking the tape whereby aluminum alkoxides (for example aluminum butoxide or isopropoxide) is diffused into the system is to be regarded as an alternative to radiation or other chemical methods of cross-linking discussed hereinafter.

Preferably, the proportion by weight of the polymer (or, where a blend, of the polymers in the blend) of units derived from ethylenically unsaturated hydrocarbons is at least 50 %, preferably at least 60 %; preferably the proportion is at most 90 %. At too low hydrocarbon ranges the polymer tends to be insufficiently crystalline to have recovery properties. If the hydrocarbon range is too high, the adhesion of the layers tends to suffer. It will be apparent that the most preferred proportions within the range will differ from one copolymer to another and it will also be apparent that it is but a matter of routine experiment to determine optimum ratios in any particular case.

The polymers may be blended with tackifying or adhesion-improving substances, for example, phenol-aldehyde adducts, ketone-aldehyde adducts, partially hydrolyzed silanes (for example, those described in British patent specification No. 1,255,493) or mixtures thereof. Such additions improve the adhesion of the polymers to certain substrates, as will be seen from the Examples.

The polymer may also be admixed with another polymer to improve chemical or physical characteristics, for example, flexibility. As examples of "flexibilizing" polymers, there may be mentioned rubbers, for example an ethylene-propylene rubber. Especially suitable are oil extended ethylene-propylene copolymers containing about 50 % to about 80 % of ethylene, the preferred oil being a naphthenic oil when the material is to be used in connection with high voltage equipment. Preferably, the flexibilizing additive is present in a proportion of up to 20 % by weight of the polymer mixture.

The flexibility is also affected by the melt index of the polymer; in general the melt index may be from 1 to 500, preferably 2 to 200. The higher the index, the more flexible the polymer.

The base polymers may optionally also contain the usual additives such as fillers, flame retardants, antioxidants, stabilizers and pigments. Typical of these classes of material are carbon blacks; metallic oxides, for example, ferric oxide, zinc oxide, titanium dioxide; silicas and silicates, alumina, hydrated alumina, barium sulphate or calcium sulphate, phenolic or amine antioxidants; stabilizers, for example, dibasic lead phosphite and dibasic lead fumarate; pigments, for example, phthalocyanines, lead molybdate, cobalt blue and chrome green.

The materials may be blended by methods generally used in the plastics industry, for example, in a two-roll mill or Banbury mixer. The material may then be fabricated into a tube, flat sheet, or tape by any of the usual fabrication processes, for example lay-flat, ribbon dye or calendering. The material can then be slit to the desired width; slitting is preferably carried out after expansion. The shape of the material may be such that in use its width is of the same order as its length, and throughout out this specification the word "tape" is to be understood as including materials whose major dimensions are such that they would normally be regarded as sheet.

The tape may be crosslinked before or after stretching; crosslinking may be by chemical means or by irradiation. As chemical crosslinking agents there may be mentioned peroxide catalysts and Claisen condensation catalysts. Typical examples are 2,5-dimethyl-2,5-di(-tert.butyl peroxy)hexane, 2,5-dimethyl-2,5-di(tert.butyl peroxy) hexyne-3, dicumyl peroxide, di tert.butyl peroxide, dibenzoyl peroxide, tert.butyl peroctoate, tert-.butyl perbenzoate, tert.butyl percrotonate, tert.butyl perpivalate, diisopropyl peroxy dicarbonate, hexylene glycol benzoate perbenzoate, lauroyl peroxide and propionyl peroxide. Suitable Claisen catalysts include sodium hydroxide, potassium hydroxide, sodium ethoxide.

Radiation crosslinking may be achieved by means of ultraviolet or high energy electron irradiation, or a γ-ray source, for example, cobalt 60, with or without the presence of polyfunctional monomers, for example, divinyl benzene, allyl methacrylate, trimethylol propane or triallyl cyanurate. In the absence of such monomers, the dose may be, for example, 1 to 50 Mrad., preferably 2 to 30 Mrad. The dose required in any particular case is reduced by the addition of the monomer. Where ultraviolet radiation is employed, one of the usual sensitizers, for example benzophenone, is added.

Preferably, the tape will be approximately 0.01 to 1.0 cm thick, for example about 0.1 cm., although the thickness will depend to some extent on the strength of the material, its degree of expansion and the purpose for which it is intended. Although the materials may be expanded by up to 3 or 4 times the original dimensions, normally an expansion of 1.25 to 1.5 is preferred.

It will be understood that, where a high degree of shrinkage is not essential, it is not necessary to carry out a deliberate stretching of the materials to render them heat-shrinkable or suitable for use in the process of the invention. In cases where a small degree of shrinkage is sufficient, this may be achieved inherently by the orientation caused in the extrusion of the film, or by the tension resulting from wrapping, or a combination of these processes. Thus, if a tape is oriented during extrusion or is applied to a substrate under tension then on heating above its crystallite melting point it will shrink around the substrate and fuse to form a coherent mass. In this specification, therefore, "heat-shrinkable" includes a material that is capable of shrinking on heating from any of these causes.

The heat shrinkable and fusible films and tapes of the present invention have numerous uses in a wide variety of industries, for example, in the electrical industry, they may be used to protect and insulate joints, splices, terminations in all types of cables and wires, as direct insulation for metallic conductors such as copper busbars, or as coverings for wave-guides. They may also be used as protective covers, for example on pipes for corrosion protection, or on air ducts as seals. Numerous other uses will be apparent to those skilled in the art.

The following Examples, in which parts are by weight, illustrate the invention.

EXAMPLE 1

The following formulations were intimately mixed on a laboratory two roll mill and then chipped and extruded into film 0.010 in. thick.

| Ingredients | Formulation No. | | |
|---|---|---|---|
| | 1 | 2 | 3 (control) |
| | parts by weight | | |
| Elvax 4260 | 180 | 180 | — |
| DPD 6169 | 90 | 90 | — |
| Antioxidant | 1.5 | 1.5 | 1.5 |
| Partially hydrolyzed silane | — | 1.0 | — |
| Low density polyethylene melt flow index 6 | — | — | 200 |

The antioxidant was Agerite Resin D.

Elvax 4260 is an ethylene vinyl acetate - unsaturated acid terpolymer containing about 28 % vinyl acetate, has a melt flow index of 6 and an acid number of 4 to 8. It is manufactured by E. I. du Pont de Nemours & Co. Inc.

DPD 6169 is an ethylene-ethyl acrylate copolymer of melt flow index 4, and contains about 18 % of ethyl acrylate, and is manufactured by Union Carbide Corporation. The silane was partially hydrolyzed [N-bis(2 hydroxy ethyl)] 3-aminopropyl triethoxy silane.

The films were irradiated using a 1.5 Mev electron accelerator to the following doses:
1. 4 Mrad
2. 4 Mrad
3. 10 Mrad.

Each film was stretched approximately 50 % after irradiation (similar results were obtained when the films were stretched prior to irradiation). Each film was heat shrinkable. The films were then wrapped with 50 % overlap and slight tension onto mandrels as indicated and heated with a hot air blower for about 30 seconds.

The bond strengths were as follows on cooled samples.

| Formulation | Copper | Mandrel Aluminium | Aluminium covered with crosslinked polyethylene |
|---|---|---|---|
| 1 | Good adhesion and surface finish | Very good adhesion and finish | Good adhesion and finish |
| 2 | Good adhesion and finish | Very good adhesion and finish | Good adhesion and finish |
| 3 | Negligible adhesion and blistered surface | Very poor adhesion, blistered surface | Very good adhesion, blistered surface |

In addition, it was noted that the individual layers of formulations 1 and 2 could not be separated without breaking the film, whereas formulation 3 could just be separated without breaking although much stretching occurred.

Quantitative evaluation of the adhesive properties of the three films was obtained as follows:

Strips of aluminium 4 × 1 inch were degreased in MEK and then etched in a solution of Chemlok 701 (36 g/liter) at a temperature of 85° C for 1 minute. The strips were then washed in distilled water. Film samples 1 × 0.5 in. from each formulation were placed between 2 strips of aluminum with 0.5 in. overlap. Sets of joints (five per formulation) were placed under a weight of 2 lb. in an air circulating oven for 20 minutes at 150° C. The joints were then allowed to cool to room temperature.

Similarly, joints were made with a sample 0.060 inch thick of commercially available flame retarded radiation crosslinked polyolefine material, except that no etchant was used and the samples were lightly abraded with 320 Emery cloth and the overlap length was about 1.5 inches. The shear and peel strengths of the joints were measured at various temperatures on an Instron tensometer at a jaw separation rate of 2 inches/min. The results obtained were as follows:

Aluminium Shear Strengths

| | Shear Strength in lb/sq. in. Formulation | | |
|---|---|---|---|
| Temperature | 1 | 2 | 3 |
| 23° C | 700 | 900 | 50 |
| 80° C | 65 | 100 | 0 |
| 120° C | 30 | 41 | 0 |
| 140° C | 21 | 35 | 0 |

Peel Strengths in lb/inch width at 23° C

| | Formulation | | |
|---|---|---|---|
| Substrate | 1 | 2 | 3 |
| Aluminium-XL polyolefine | 22 | 25 | negligible |
| XL polyolefine-XL polyolefine | 70* | 70* | 70* |

*The polyolefine failed in all samples, with bond intact. "XL" represents "crosslinked".

These results demonstrate that the materials of this invention are heat-shrinkable and fusible and possess good adhesion characteristics, even at elevated temperatures. They also show that although the control, i.e., polyethylene, bonds well to crosslinked polyolefine, it does not bond satisfactorily to itself or to metallic substrates. Furthermore, its surface blisters readily on heating.

EXAMPLE 2

The following formulation was prepared in a similar fashion to that in Example 1.

| | gm |
|---|---|
| Elvax 4260 | 56 |
| Elvax 4320 | 38 |
| Antioxidant as in 1) | 0.5 |
| Hydrolyzed Silane as in 1) | 0.4 |

Elvax 4320 is an ethylene-vinyl acetate - unsaturated acid terpolymer containing 25 % vinyl acetate, has a melt index of about 150 and an acid number of 4 to 8. Film 0.025 in. thick was made from this formulation and irradiated to a dose of 20 Mrad. This tape was stretched 25 % and then wrapped with slight tension, approximately 50 % overlap around a PTFE coated mandrel. The assembly was lightly heated with a gas flame until the surface became glossy and then allowed to cool. Attempts were then made to peel the layers apart but with no success. Strips were cut lengthwise along the mandrel axis and pulled in an Instron tensile tester with the result that the film broke before the joint. These experiments demonstrate the self-fusibility of the new composition.

Peel and shear joints as in Example 1 were prepared and the following results were obtained:

| Peel Strength at room temperatures | |
|---|---|
| Crosslinked Polyolefin-crosslinked Polyolefin | 37 lb/in width |
| Crosslinked Polyolefin-Aluminium | 37 lb/in width |
| Lap Shear Strength | |
| Room Temperature | |
| Aluminium-Aluminium | 490 lb/sq.in. |
| Stainless Steel-Stainless Steel | 330 lb/sq.in. |
| Copper-Copper | 266 lb/sq.in. |

These results show the good adhesion obtainable to metal substrates with the materials of the invention.

EXAMPLE 3

The following formulation was prepared in a similar fashion to Example 1.

| | gm |
|---|---|
| Elvax 4320 | 42.4 |
| Elvax 4260 | 61.6 |
| Agerite Resin D | 0.5 |
| Hydrolyzed silane (as in Example 1) | 2.5 |
| Carbon black | 0.25 |
| Dechlorane + plus | 15.0 |
| Antimony trioxide | 10.0 |

Dechlorane + plus is believed to be 1,4,7,10-dimethanocycloocta-1,2,3,4,7,8,9,10,13,13,14,14-dodecachloro-1,4,4a,5,6,6a,7,10,10a,11,12,12a-dodecahydro(1,2,5,6)dibenzene.

Film 0.020 in. thick was made from this formulation and irradiated by high energy electrons to a dose of 20 Mrad. The tape was stretched about 25 % and wrapped with slight tension at approximately 50 % overlap onto a PTFE mandrel. This assembly was heated with a gas flame as in Example 2 until the surface became glossy and then allowed to cool. When cool, attempts were made to peel the layers apart, but without success. Strips were cut lengthwise and pulled in an Instron tensile tester. The film broke before the joint, indicating the high degree of self-fusibility of the formulation.

Strips of the fused layer were ignited for 10 secs. with a gas flame and the flame then removed, whereupon the tape which had been burning with difficulty self-extinguished.

This example shows that the compositions of the invention can be loaded with high filler loadings, in this case flame retardants, without loss of the valuable fusibility characteristic. Furthermore, using the film of this example to prepare an adhesive joint of cross-linked polyolefin to crosslinked polyolefin as in Example 1, a peel strength at room temperature of 43 lb/in. width was obtained.

EXAMPLES 4 – 6

The following formulations were prepared in a similar manner to Example 1, at a temperature of about 100° C.

| Example No: | 4 | 5 | 6 |
|---|---|---|---|
| Elvax 4320 | 75 | 75 | 75 |
| Elvax 4260 | 75 | 75 | 75 |
| Elvax 40 | 20 | 20 | 20 |
| Agerite Resin D | 1.0 | 1.0 | 1.0 |
| Trimethylol propane trimethacrylate | 20.0 | 20.0 | 20.0 |
| Hydrolyzed silane as in Example 1 | 2.5 | 2.5 | 2.5 |
| Methyl ethyl ketone-formaldehyde tackifier | 30.0 | 30.0 | 30.0 |
| Itaconic acid | 10 | — | — |
| Mono methyl itaconate | — | 10 | — |
| Di n-butyl itaconate | — | — | 10 |

Elvax 40 is an ethylene-vinyl acetate copolymer containing about 40 % of vinyl acetate and having a melt index of about 40.

These formulations were made into tape 0.020 in. thick and irradiated to a dose of 2.5 Mrad. Tapes made from each formulation and stretched 25 % in length were wound onto a PTFE mandrel as before with slight tension and approximately 50 % overlap. After heating with a gas flame until the surfaces became glossy, and then allowing to cool, it was found that all three formulations had fused to the extent that the individual layers could not be peeled apart.

The adhesion properties of the materials were also evaluated as in Example 1, with the following results.

Peel Strengths in lb/inch width at 23° C

| Substrates | Example No. 4 | 5 | 6 |
|---|---|---|---|
| Aluminium-XL polyolefine | 67 | 67 | 43 |
| XL polyolefine-lead | 22 | 13.5 | 22 |
| XL polyolefine-XL polyolefine | 47 | 41 | 42 |

These results demonstrate that the materials of this invention are heat-shrinkable, fusible and possess good adhesion characteristics to a variety of substrates.

The products of the invention may be used as the liner for a hose by wrapping a tape of a material or, if desired, a unitary tape about a steel or crosslinked high density polyethylene tubular mandrel which is preferably covered or coated with a release agent, the material of the invention being heated to cause it to bind tightly around the mandrel. The remainder of the hose may be manufactured in the manner known to those skilled in the art, for example, by applying a rubbery compound around the material of the invention, reinforcing material such as steel or polyethyleneterephthalate being applied, the rubbery compound being vulcanized. After completion of this process, the mandrel is removed from within the hose, if necessary using air pressure between the mandrel and the hose.

We claim:

1. A method of covering a substrate, which comprises applying to the substrate a heat shrinkable tape in overlapping relation, said tape comprising a cross-linked copolymer formed from an ethylenically unsaturated hydrocarbon and a carboxylic acid ester having ethylenic unsaturation said tape having the property of adhesively bonding to itself upon heating, and heating the tape to cause it to shrink about the substrate and the overlapping layers to adhesively bond to each other.

2. The method of claim 1, wherein said tape is longitudinally shrinkable.

3. The method of claim 1, wherein said tape is longitudinally shrinkable without substantial change in width.

4. The method of claim 1, wherein said hydrocarbon is selected from the group consisting of ethylene and an α-ethylenically unsaturated aliphatic hydrocarbon.

5. The method of claim 1, wherein the ester is selected from the group consisting of vinyl acetate, vinyl butyrate and vinyl propionate.

6. The method of claim 1, wherein the ester is selected from the group consisting of esters of furamic, maleic, itaconic, methacrylic and acrylic acids.

7. The method of claim 6, wherein the ester is an ethyl ester.

8. The method of claim 6, wherein the ester is a methyl ester.

9. The method of claim 1, wherein said copolymer is an ethylene-vinyl acetate copolymer.

10. The method of claim 1, wherein the tape comprises a blend of at least two such copolymers.

11. The method of claim 1, wherein the copolymer contains from about 50 to about 90% by weight of units derived from the hydrocarbon.

12. The method of claim 1, wherein the copolymer contains about 60% by weight of units derived from the hydrocarbon.

13. The method of claim 1, wherein said tape additionally comprises polymers, tackifying agents, and adhesion-improving agents blended with said copolymer.

14. The method of claim 1, wherein said copolymer is high energy radiation cross-linked.

15. The method of claim 1, wherein said copolymer is ultraviolet cross-linked.

16. The method of claim 1, wherein said tape has been stretched to a length between about 1.25 and about 1.5 times its original length.

17. The method of claim 1, wherein said tape has been stretched after cross-linking.

18. The method of claim 1, wherein said tape is under tension.

19. The method of claim 1 wherein the tape bonds to the substrate upon heating.

20. A process for the manufacture of a hose, which comprises: applying to a cylindrical mandrel a heat shrinkable tape in overlapping relation, said tape comprising a polymer formed from an ethylenically unsaturated hydrocarbon and a carboxylic acid ester having ethylenic unsaturation, said tape having the property of adhesively bonding to itself upon heating; heating the covered mandrel to cause the tape to shrink about the mandrel and the overlapping layers of the tape to adhesively bond to each other; applying hose-forming components to the covered mandrel; and subsequently removing the mandrel.

* * * * *